United States Patent [19]
Miller

[11] 3,758,977
[45] Sept. 18, 1973

[54] FISHING TACKLE BOX

[76] Inventor: Cecil V. Miller, 9243 La Rosa Dr., Temple City, Calif. 91780

[22] Filed: Oct. 4, 1971

[21] Appl. No.: 186,088

[52] U.S. Cl. .............................. 43/57.5 R, 312/201
[51] Int. Cl. ........................................... A01k 97/06
[58] Field of Search ........................ 43/57.5 R, 25.2, 43/57.5 A, 54.5 R, 54.5 A; 312/200, 201, 266, 269, 298, 300, 310

[56] References Cited
UNITED STATES PATENTS

| | | | |
|---|---|---|---|
| 3,053,006 | 9/1962 | Horner | 43/57.5 R |
| 3,490,168 | 1/1970 | Posavec | 43/57.5 R |
| 3,512,295 | 5/1970 | La Barge | 43/57.5 R |
| 2,899,770 | 8/1959 | Bartlett | 43/57.5 R |
| 3,346,313 | 10/1967 | Fee | 43/57.5 R X |
| 1,749,227 | 3/1930 | Pruett | 43/57.5 R |
| 2,608,459 | 8/1952 | Malmquist | 43/57.5 R X |
| 1,954,127 | 4/1934 | Harsted | 43/57.5 R |
| 2,948,080 | 8/1960 | Hawley | 43/57.5 R |
| 3,481,066 | 12/1969 | Woolworth | 43/57.5 R |
| 2,801,492 | 8/1957 | Katwyk et al. | 43/57.5 R |
| 3,542,446 | 11/1970 | Joyce | 312/201 X |
| 3,310,905 | 3/1967 | Davis et al. | 43/57.5 R |
| 2,724,208 | 11/1955 | Nelson | 43/57.5 R |

*Primary Examiner*—Louis G. Mancene
*Assistant Examiner*—James H. Czerwonky
*Attorney*—Herbert A. Huebner

[57] ABSTRACT

Removable panels are mounted in tackle boxes to be pivotable into and out of storage positions. The panels have recesses formed preferably on both sides in which the hook of a fish lure may be hooked with its pointed portion covered. Arrangements are included for holding lures in place on the panels including elastic retaining members, pockets formed in the panels, padding and stops mounted on the panels. An additional set of pivot mounts is formed in one embodiment of tackle box so that a removed panel may be mounted therein in a readily accessible position.

9 Claims, 13 Drawing Figures

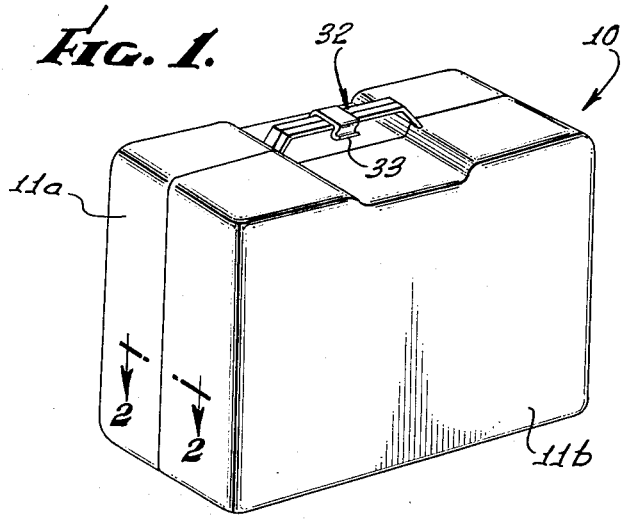
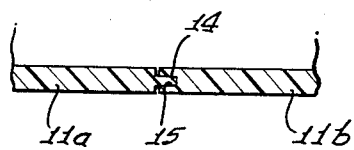
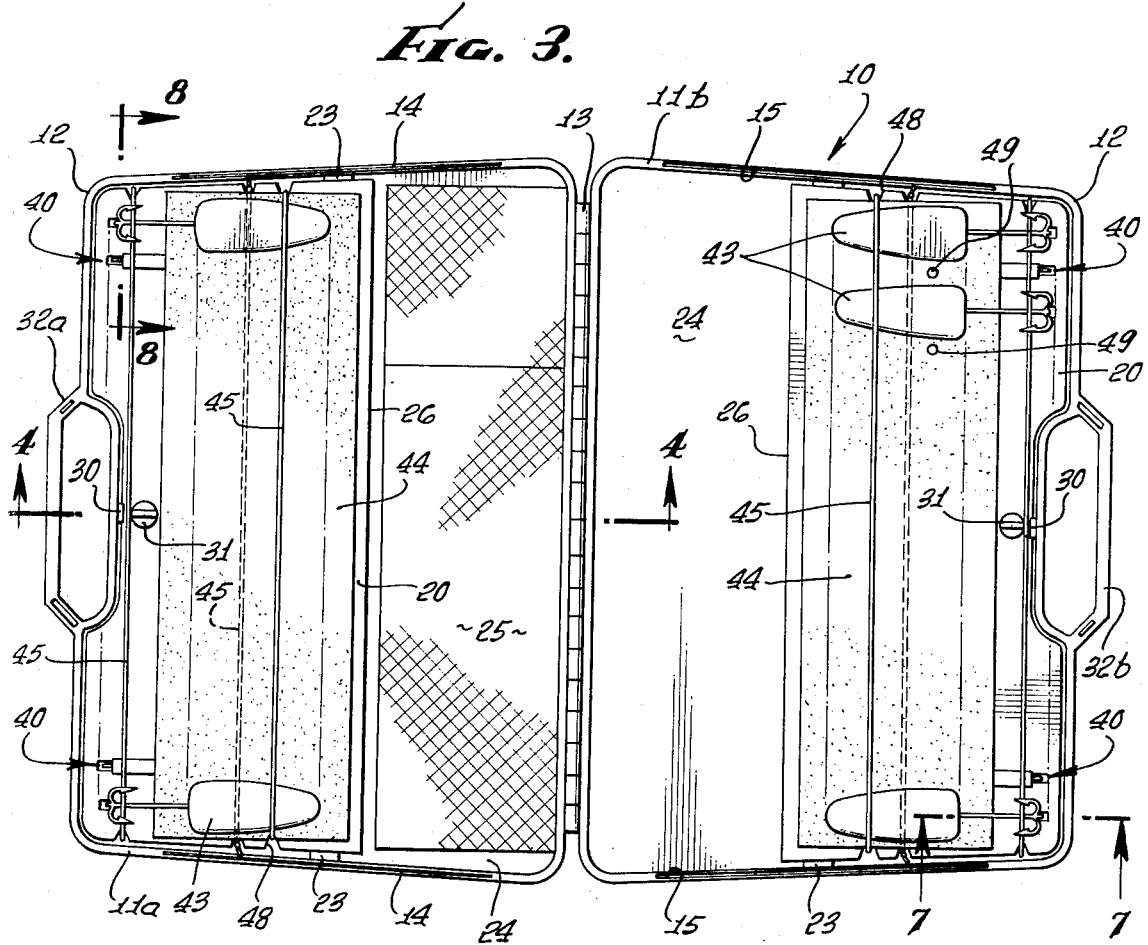

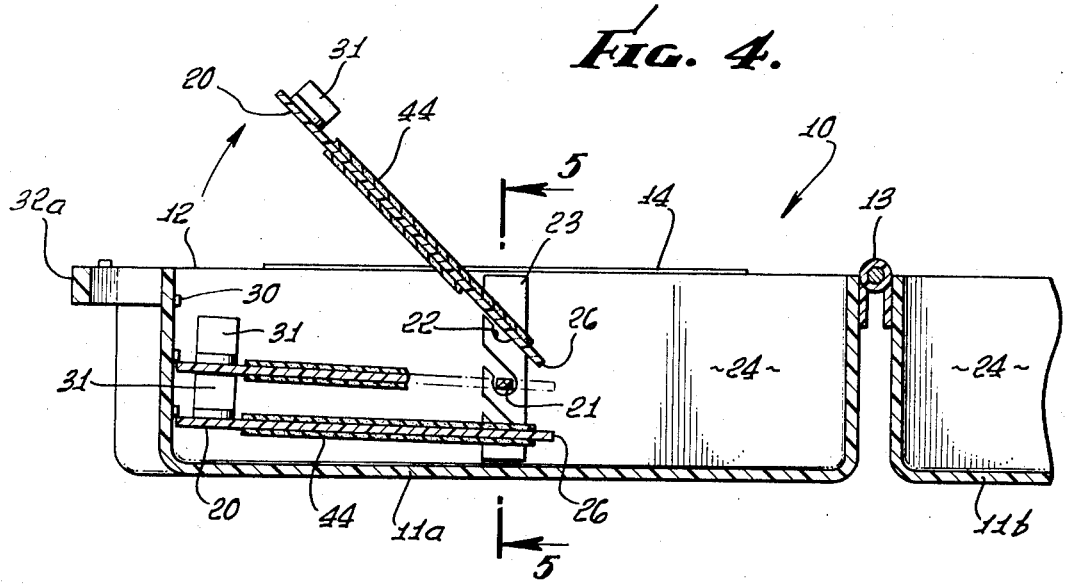
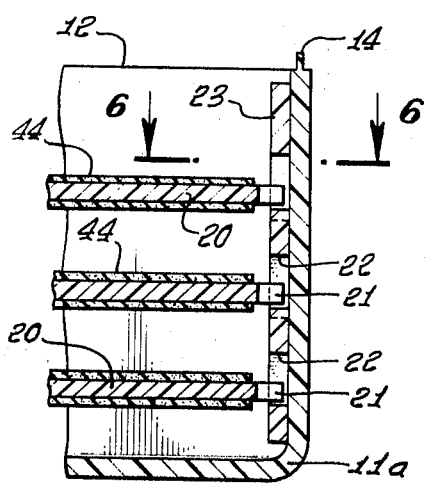
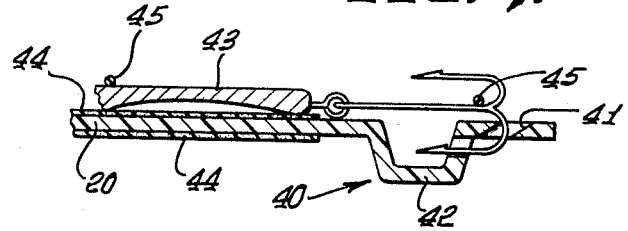
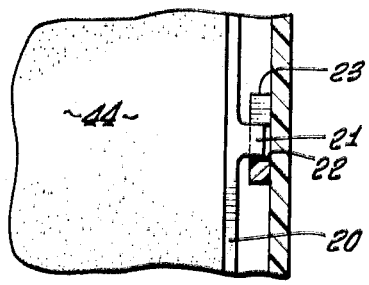
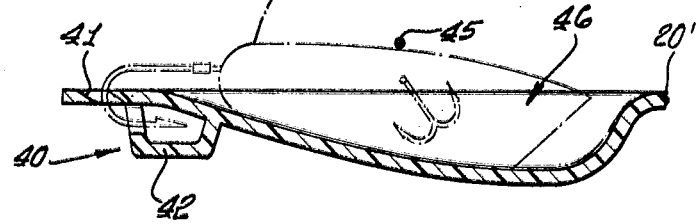

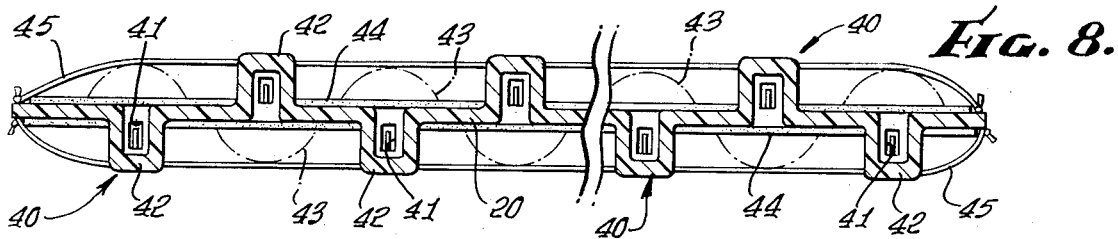
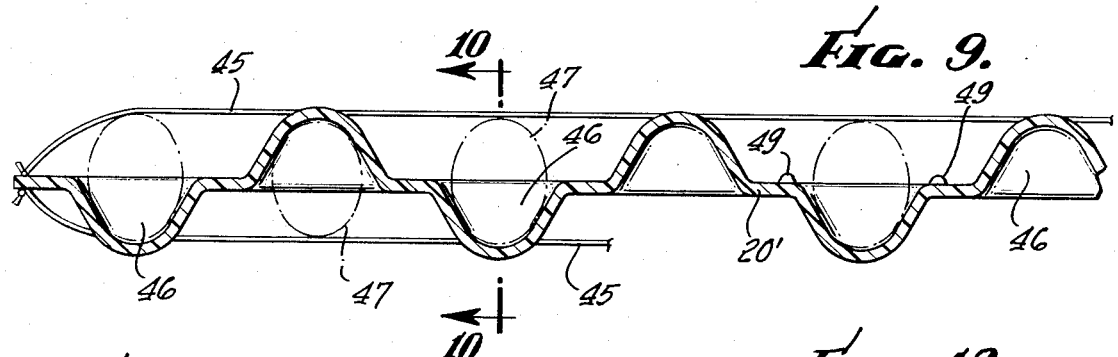
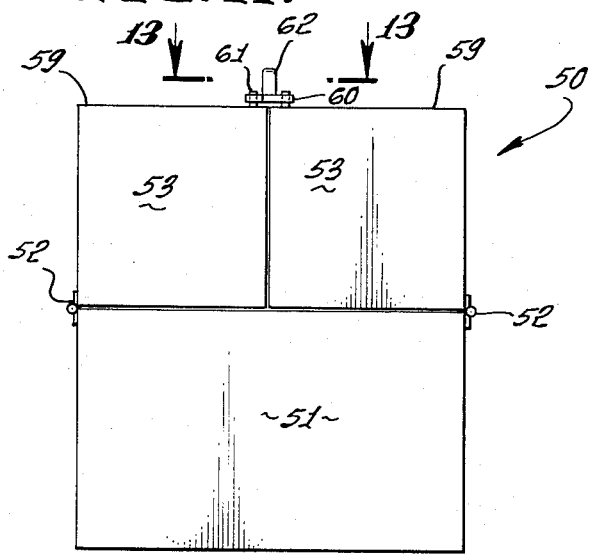
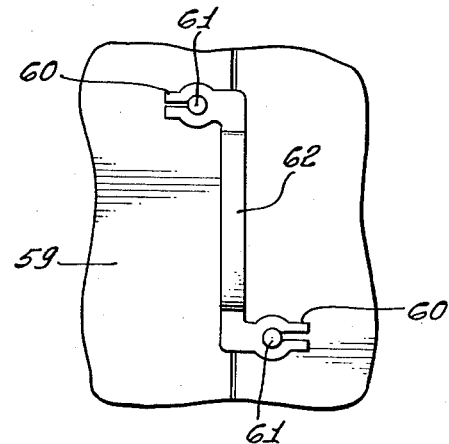
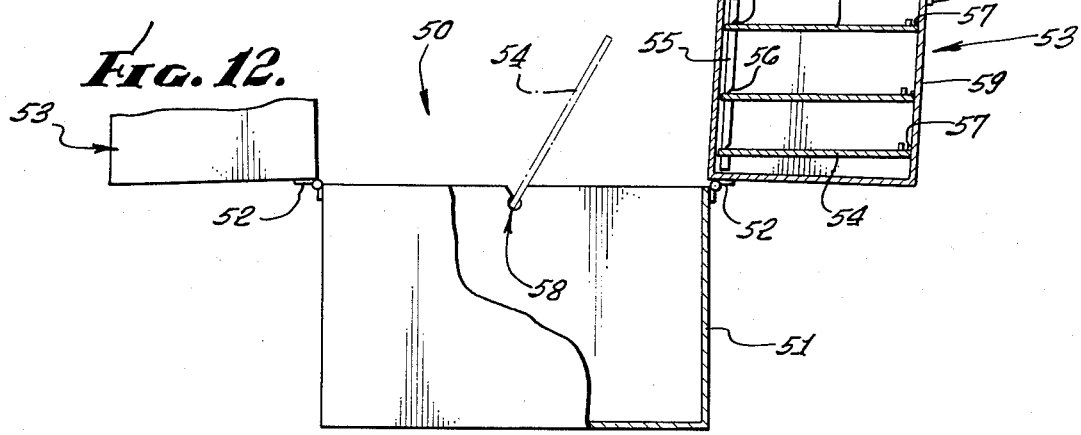

FISHING TACKLE BOX

BACKGROUND OF THE INVENTION

The present invention relates to fishing equipment, and more particularly to an improved fishing tackle box.

Heretofore, fishing lures have generally been stored in tackle boxes in relatively disorganized and unsafe manners. The lures were often stored in contact with each other and the hooks of the lures were usually free to move about in the tackle box. As a consequence, the hooks of the stored lures, particularly multiple hook lures, have tended to entangle so that a fisherman upon selecting a lure had to perform the unpleasant and time consuming task of disentangling the hooks of the selected lure from the hooks of one or more other lures stored in the tackle box. Further, since the lure hooks were uncovered and free to move, they oftentimes took unexpected positions with the result that fishermen often inadvertently caught their fingers thereon. Consequently, such tackle boxes presented safety hazards for the fishermen using them.

SUMMARY OF THE INVENTION

It is, accordingly, an object of the present invention to provide an improved fishing tackle box arranged for storing fishing lures and the like in a safe and efficient manner so that a fisherman may rapidly and safely select and remove stored lures therefrom.

It is further an object of the present invention to provide an improved fishing tackle box having at least one panel pivotally mounted therein which is arrnaged for carrying fish lures and for holding the lures and their hooks safely in place on the panel.

It is additionally an object of the present invention to provide an improved fishing tackle box having removable panel members pivotally mounted therein which are arranged to carry fish lures on both sides and having an additional set of pivot mounts included in the tackle box in which a removed panel member may be selectively mounted in a position in which a fisherman has ready access to lures stored on both sides of the panel member.

In accomplishing these and other objects, there is provided in accordance with the present invention several embodiments of improved fishing tackle boxes. The tackle boxes preferably include several removable panel members pivotally mounted therein which panels are formed to have recesses in both sides for receiving and covering at least the pointed portion of the hook of a fish lure or bait. Structure is included in each of the panel recesses for holding the lure hooks therein and arrangements are provided on the panels for holding the lures and their hooks in place. The lure holding arrangements may take the form of elastic retaining members, pockets formed in the panels to receive the lure bodies, padding attached to the panels to limit lure movement, and/or stops secured to the panels to limit lure side to side movement. The panels are mounted in the tackle boxes to be pivotal into and out of a storage position and arrangements are included for securing the panels in their storage positions. Knobs are also included for gripping the panels to enable a fisherman to pivot each panel out of its storage position. An additional set of pivot mounts is included in one embodiment of tackle box so that a removed lure carrying panel may be selectively mounted therein in a position in which a fisherman has ready access to lures stored on both sides of the panel.

Additional objects of the present invention reside in the specific construction of the exemplary embodiments of fishing tackle boxes hereinafter particularly described in the specification and shown in the several drawings.

BRIEF DESCRIPTION OF THE DRAWINGS

FIG. 1 is a perspective view of one embodiment of fishing tackle box according to the present invention latched in its closed position;

FIG. 2 is a sectional view taken along the line 2—2 of FIG. 1 illustrating the watertight seal of the tackle box;

FIG. 3 is a plan view of the tackle box of FIG. 1 in its opened position;

FIG. 4 is a sectional view taken along the line 4—4 of FIG. 3;

FIG. 5 is a sectional view taken along the line 5—5 of FIG. 4;

FIG. 6 is a sectional view taken along the line 6—6 of FIG. 5;

FIG. 7 is a sectional view taken along the line 7—7 of FIG. 3;

FIG. 8 is a sectional view taken along line 8—8 of FIG. 3 which illustrates one embodiment of panel member which may be pivotally mounted in the tackle box of FIG. 1;

FIG. 9 is a sectional view of another embodiment of panel member which may be pivotally mounted in the tackle box of FIG. 1;

FIG. 10 is a sectional view taken along the line 10—10 of FIG. 9;

FIG. 11 is an end view of another embodiment of fishing tackle box according to the present invention latched in its closed position;

FIG. 12 is a partially cut away end view of the tackle box of FIG. 11 in its opened position; and FIG. 13 is a view taken along the line 13—13 of FIG. 11.

DETAILED DESCRIPTION OF THE PREFERRED EMBODIMENTS

Referring to the drawings in more detail, there is shown in FIGS. 1–10 one embodiment of fishing tackle box generally designated by the numeral 10. The tackle box 10 is preferably formed like a suitcase by two substantially identical halves 11, designated 11a and 11b. The halves 11 are connected together along their base by hinge 13 to form a box-like container which may be pivoted closed, as shown in FIG. 1, or selectively opened to the flat open position shown in FIG. 3. As shown in FIG. 2, a watertight seal arrangement is formed along edge 12 of the box havles 11 by a lip or tongue 14 and a mating groove 15. The lip structure 14 is formed on the edge 12 of box half 11a while the groove 15 with which it mates or interfits is formed in the edge 12 of box half 11b.

Mounted in each of the box halves 11 are several panel members 20, three panels 20 being shown for purposes of illustration mounted in each box half 11. The panel members 20 serve as trays for carrying fishing lures, baits, or plugs and are pivotally mounted in the tackle box 10 by means of a pair of pivots or extensions 21 formed on the side edges of each panel member 20 adjacent its base edge 26. These extensions 21 are preferably rectangular shaped and are dimensioned to fit in slots 22 which are formed in support members 23. The supports 23 are mounted on the sides of the box halves 11. The slots 22 form pivot mounts which are preferably circular for the extensions 21 on the panels 20, as shown in FIGS. 4–6. The slots 22 preferably open on an upward extending angle, as shown in FIG. 4, and are dimensioned so that the rectangular extensions 21 may be removed from the slots 22 only by positioning its panel 20 in alignment with the angle of the slots 22 and pulling the panel 20 outward. Thereby, any one of the panels 20 may be selectively removed from its pivotal mounting in the tackle box 10. The support members 23 are shown placed at a position midway along the sides of the box halves 11, and the panel members 20 are appropriately diemnsioned to extend to the top end of the box havles 11. By mounting the support members 23 midway in the box halves 11, storage space 24 is thereby defined in the lower part of each half of the tackle box 10 between the hinge 13 and the pivot structure 23 for holding fishing reels and the like. As shown in FIG. 3, the storage space 24 may be divided into compartments by mounting elastic webbing 25 therein. It is noted that the storage space 24 could be eliminated if desired and that the supports 23 could be mounted adjacent the base of the halves 11 so that larger panels 20 could be used which would extend across the entire width of the halves 11.

Each of the panels 20 is preferably shaped to have a slightly greater dimension at its base edge than its top edge in order to prevent buckling in the middle of the panel. The panels 20 may be made of any suitable material, such as a suitable plastic.

Each of the panel members 20 is pivotable to a storage position where is it retained by longitudinally tapered spaced apart stops 30 as shown in FIG. 4. The stops 30 are formed on the inside top wall of each of the box halves 11. A panel member 20 may be pivoted out of its storage position by gripping a knob 31 secured thereon. The knobs 31 are preferably centrally secured on each panel 20 adjacent its upper edge. By gripping the knob 31 and pulling outward, a panel 20 may be pulled past its tapered stop 30 to a position in which a fisherman has access to both sides of the panel member 20. In addition to providing means for gripping the panels 20, the knobs 31 may be appropriately dimensioned to function as spacers. As shown in FIG. 4, the knobs 31 hold adjacent panels 20 a predetermined distance apart when the panels 20 are pivoted into their storage position.

Formed on the top wall of each box half 11a and 11b, respectively, are the halves 32a and 32b of a split handle 32. The split handle 32 is formed, as shown in FIG. 1, when the tackle box 10 is latched closed. The split handle 32 is secured closed by placing a preferably resilient clamp or lock clip 33 around the halves of the split handle 32. It is noted that while the clamp 33 is used for latching the tackle box 10 in its closed position that any suitable type of clamping or latching arrangement may be used to secure it in a closed position. Further, it is noted that the tackle box halves 11 may be formed of any suitable material, such as a substantially rigid yet slightly springy plastic material.

As shown in FIG. 7, each of the panels 20 has indentations or recess means 40 formed therein. Each recess means 40 includes a hole or opening 41 and a covering structure 42. The hole 41 is preferably drilled or formed at an angle to the surface of the panel 20 so as to slant towards and thereby be in alignment with the covering structure 42. The hole 41 is designed to receive the hook of a fish lure and the covering structure 42 is designed to receive and cover the pointed portion of a hook inserted through the hole 41. One hook of a spoon type fish lure 43 is shown hooked in the structure of one of the recess means or recesses 40 in FIG. 7. The panel member 20 shown in FIG. 7 has padding 44 secured thereon on the panel portion against which the body of the lure 43 rests. Such a panel is shown in FIG. 8 with padding 44 secured on both sides. A pair of resilient or elastic bands 45 are shown secured around the panels 20 in FIG. 3 in order to hold the lures in place. One band or cord 45 is secured to the panel 20 to extend over the hook of the lure 43, as shown in FIG. 7, to hold the lure hook securely in place, and the other band 45 is secured around the body of the lure 43. The elastic bands 45 which are preferably made of neoprene rubber function as retaining members and may be attached to the panels 20 in any appropriate manner, such as by securing their ends in notches 48 in the sides of the panels 20, as shown in FIG. 3. A plurality of lures 43 are shown hooked in place on the panel in FIG. 8 and the padding material 44 secured on the panel 20 provides a cushioned contact surface against which the lures 43 are pressed by the holding members 45. The friction between the padding 44 and the lures 43 restricts the movement of the lures 43 on the panel 20.

An alternate form of panel member designated 20′ is shown in FIGS. 9 and 10. The alternate form of panel member has pockets or indentations 46 formed therein in conjunction with each of the recesses 40 so that the body of a fish lure may be seated in the pockets 46. The pockets 46 function to restrict the side to side movement of the lures seated therein. It is noted that a panel member 20′ having pockets 46 formed therein, as shown in FIGS. 9 and 10, is particularly suitable for use with a flat fish type of lure 47, such as shown in FIG. 10, or a bass type plug. As may be seen from a comparison of FIGS. 7 and 10, a flat fish lure 47 has a body portion which is substantially thicker than the body portion of the spoon lure 43. Flat fish and bass type lures also generally have multiple hooks attached to their sides and the pockets 46 in cooperation with the elastic bands 45 tend to hold the additional hooks in place on the panel 20′.

It is noted that on the types of panels shown in both FIGS. 8 and 9 the recess means 40 formed by the holes 41 and covering structure 42 are preferably spaced in rows and arranged to extend alternately in opposite directions. Thereby, fishing lures may be mounted in an organized manner on both sides of the panels 20 and 20′. Stops or projections 49 may be formed on the panels to restrict the side to side movement of lures mounted thereon. One set of stops 49 is shown in FIG. 3 formed on the panel 20 shown on the right handed side of the tackle box 10. One of the stops 49 is formed on each side of the spoon type lure 43 secured on the panel 20. Thereby, the set of stops 49 limits the side to side movement of the lure 43 on the panel 20. Another exemplary set of stops 49 is shown in FIG. 9 where bosses are shown formed on the panel 20′ on each side of one of the lure pockets 46.

An alternate embodiment of fishing tackle box is shown in FIGS. 11–13 and is generally identified by the number 50. The tackle box 50 is formed to have a rectangular upward opening bottom portion 51. The bottom portion 51 preferably has sufficient depth for storing fishing reels and the like therein. Mounted by means of hinges 52 along the upper side edges of the bottom portion 51 are similarly constructed upper box halves 53. The upper box halves 53 have several panel members 54 pivotally mounted in a layer-like arrangement on each side. The panel members 54 may be of the types shown in FIGS. 8 and 9 and are pivotally mounted in support structure 55. The structure 55 defines open pivot mounts 56 and the panels 54 are pivotally mounted in the structure 55 in the same manner that the panels 20 are pivotally mounted in the support structure 23 of the above-described tackle box 10. The panels 54 are retained in a storage position, as shown in FIG. 12, by means of the stops 57 formed along the upper wall 59 of the box halves 53. The panels 54 may be selectively removed from the open pivot mounts 56 and an additional set of pivot mounts are formed by key slots 58 centrally in the upper edges of the ends of the bottom box portion 51. A panel member 54 removed from one of the box halves 53 may be pivotally mounted in the pivot mounts provided by the key slots 58, as shown in phantom lines in FIG. 12, in a position in which a fisherman has ready access to both sides of the panel 54 mounted therein. Thereby, a fishing lure carried on either side of the panel 54 may be readily selected and safely removed from its stored position. In order to maintain box halves 53 in the position illustrated in FIG. 12, any conventional stop members may be provided on the tackle box 50.

The tackle box 50 is shown latched in its closed position in FIGS. 11 and 13 and is locked in its closed position by means of an upward extending handle 62 which has resilient clamp structure 60 formed on its ends which mates with projections or buttons 61 formed on the upper surfaces of the box halves 53.

Thus, there has been provided several embodiments of an improved fishing tackle box having panels pivotally mounted therein which may be selectively removed therefrom or pivoted into positions in which a fisherman has ready access to both sides of the panels. The panels are arranged with recesses or recess means in which the hooks of fish lures may be hooked to mount the lures on the panels and each recess is designed to cover the pointed portion of a hook hooked therein so as to protect a fisherman from being hooked by the pointed end of the hook which extends through the panel.

Further, structure or holding means in the form of resilient bands, padding, pockets formed in the panels, and stops formed on the panels is provided to restrict the movement of lures stored on the panels so as to avoid entanglement of the hooks of one fishing lure with another. Thus, the exemplary tackle boxes are arranged so that a fisherman may conveniently select a fishing lure to be used and rapidly and safely remove the lure selected from the tackle box.

Although I have herein shown and described my invention in what I have conceived to be the most practical and preferred embodiments it is recognized that departures may be made therefrom within the scope of my invention.

I claim:
1. A fishing tackle box, comprising:
a closed box-like container which may be selectively opened;
at least one panel member pivotally mounted in said box-like container;
stop means formed in said box-like container for holding said panel member in a storage position, said panel member being selectively pivotable out of its storage position to a position in which a fisherman has access to both sides of said panel member;
a plurality of recess means formed in said panel member alternately on opposite sides thereof for receiving the hook of a fish lure so that lures may be attached to either side of said panel member, each of said recess means including structure upon which the hook of a fish lure may be hooked and being operable to cover at least the pointed portion of the hook of a fish lure hooked therein; and
lure holding means associated with said panel member for holding in place on said panel member lures hooked in said recess means, said lure holding means being comprised of at least one elastic member associated with said panel member, said elastic member being positioned to extend over lures hooked in said recess means so as to bear against said lures and hold them in place against said panel member, said lure holding means also including padding secured on the portions of said panel member against which said lures are pressed by said elastic member, said padding providing a frictional surface which functions to restrict the movement of said lures, said lure holding means further including pockets formed alternately on opposite sides of said panel member in the portions of said panel member against which said lures are pressed by said elastic member, said pockets being shaped to receive the bodies of said lures whereby to restrict the movement of said lures on said panel member.

2. A fishing tackle box, comprising:
a closed box-like container which may be selectively opened;
at least one panel member pivotally mounted in said box-like container;
stop means formed in said box-like container for holding said panel member in a storage position, said panel member being selectively pivotable out of its storage position to a position in which a fisherman has access to both sides of said panel member;
a plurality of recess means formed in the surface of said panel member alternately on opposite sides thereof for receiving the hook of a fish lure so that lures may be attached to either side of said panel member, each of said recess means including structure upon which the hook of a fish lure may be hooked and covering structure positioned to cover at least the pointed portion of the hook of a fish lure hooked therein; and
lure holding means associated with said panel member for holding in place on said panel member lures hooked in said recess means, said lure holding means being comprised of at least one elastic member associated with said panel member, said elastic member being positioned to extend over lures hooked in said recess means so as to bear against said lures and hold them in place against said panel member, said lure holding means also including padding secured on the portions of said panel member against which said lures are pressed by said elastic member, said padding providing a frictional surface which functions to restrict the movement of said lures, said lure holding means further including pockets formed alternately on opposite sides of said panel member in the portions of said panel member against which said lures are pressed by said elastic member, said pockets being shaped to receive the bodies of said lures whereby to restrict the movement of said lures on said panel member.

3. The invention recited in claim 2, wherein:
a plurality of said panel members are mounted for storage in a stacked layer-like arrangement in said box-like container; and
each of said panel members is mounted on pivots in said box-like container to be pivotable therein and removable therefrom; and including:
pivot mount means formed on said box-like container for receiving the pivots of one of said panel members which has been removed from its pivotable mounting in said box-like container, said pivot mount means being operable to pivotably support therein one of said panel members in a position in which a fisherman has access to both sides of said panel member.

4. The invention defined in claim 3, including knobs mounted on each of said panel members for maintaining said panel members in predetermined spaced apart relationship in their storage position and for gripping said panel members when pivoting one of said panel members out of its storage position.

5. The invention defined in claim 2, wherein:
said box-like container which may be selectively opened and closed includes interfitting lip and groove structure formed on the edges along which it opens, said interfitting lip and groove structure being operable when said box-like container is closed to form a watertight seal so that said box-like container is substantially watertight when closed; and
said box-like container is constructed like a suitcase and has compartments defined therein for holding fishing reels and the like.

6. The invention defined in claim 2, wherein said lure holding means comprises:
projections formed on said panel member to restrict the side to side movement of lures hooked thereon;
a first elastic member associated with said panel member and positioned to extend over and bear against a lure hook hooked in said recess means so as to hold the lure hook in place on said panel member; and
a second elastic member associated with said panel member and positioned to extend over and bear against the body portion of a lure hooked in said recess means so as to hold the body portion of the lure in place on said panel member.

7. A fishing tackle box, comprising:
a closed box-like container which may be selectively opened;
at least one panel member pivotally mounted in said box-like container;
a plurality of recess means formed in said panel member alternately on opposite sides thereof for receiving the hook of a fish lure so that lures may be attached to either side of said panel member, each of said recess means including structure upon which the hook of a fish lure may be hooked and being operable to cover at least the pointed portion of the hook of a fish lure hooked therein; and
lure holding means associated with said panel member for holding in place on said panel member lures hooked in said recess means, said lure holding means being comprised of at least one elastic member associated with said panel member, said elastic member being positioned to extend over lures hooked in said recess means so as to bear against said lures and hold them in place against said panel member, said lure holding means also including pockets formed alternately on opposite sides of said panel member in the portions of said panel member against which said lures are pressed by said elastic member, said pockets being shaped to receive the bodies of said lures whereby to restrict the movement of said lures on said panel member.

8. The invention defined in claim 7, including stop means formed in said box-like container for holding said panel member in a storage position, said panel member being selectively pivotable out of its storage position.

9. The invention defined in claim 7, wherein said lure holding means also includes padding secured on the portions of said panel member against which said lures are pressed by said elastic member, said padding providing a frictional surface which functions to restrict the movement of said lures.

* * * * *